US012136768B2

(12) United States Patent
Chiang

(10) Patent No.: US 12,136,768 B2
(45) Date of Patent: Nov. 5, 2024

(54) THREE-DIMENSIONAL ANTENNA STRUCTURE

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 159 days.

(21) Appl. No.: 18/167,870

(22) Filed: Feb. 12, 2023

(65) Prior Publication Data

US 2024/0275064 A1 Aug. 15, 2024

(51) Int. Cl.

| | |
|---|---|
| ***H01Q 21/20*** | (2006.01) |
| ***H01Q 9/42*** | (2006.01) |
| ***H01Q 21/24*** | (2006.01) |

(52) U.S. Cl.

CPC ............... *H01Q 21/24* (2013.01); *H01Q 9/42* (2013.01); *H01Q 21/205* (2013.01)

(58) Field of Classification Search

CPC ........ H01Q 9/42; H01Q 21/20; H01Q 21/205; H01Q 21/24

See application file for complete search history.

(56) References Cited

U.S. PATENT DOCUMENTS

| | | | | |
|---|---|---|---|---|
| 2019/0020110 | A1* | 1/2019 | Paulotto | H01Q 5/392 |
| 2019/0296435 | A1* | 9/2019 | Wu | H01Q 3/24 |
| 2020/0091618 | A1* | 3/2020 | Ng | H01Q 9/0421 |

* cited by examiner

*Primary Examiner* — Daniel Munoz

(74) *Attorney, Agent, or Firm* — Li & Cai Intellectual Property Office

(57) ABSTRACT

A three-dimensional antenna structure is applicable to a transmission frequency band, and includes an insulating carrier, an M number of first antennas, an M number of microstrip lines, a second antenna, and a grounding element. The M microstrip lines are electrically coupled to the M first antennas. The second antenna is electrically coupled to the M first antennas through a connection point of each of the M microstrip lines, and has an M−1 number of line segments. Any end of each of the M−1 line segments correspond in position to one of the connection points of the M microstrip lines. A length of each of the M−1 line segments is 1/M times a wavelength corresponding to a center frequency of the transmission frequency band. The grounding element is electrically coupled to the M first antennas through the M microstrip lines.

9 Claims, 9 Drawing Sheets

THREE-DIMENSIONAL ANTENNA STRUCTURE

FIELD OF THE DISCLOSURE

The present disclosure relates to an antenna structure, and more particularly to a three-dimensional antenna structure.

BACKGROUND OF THE DISCLOSURE

Antenna structures are mostly designed to be three-dimensional, so as to reduce a space occupied by the antenna structures in a final product (e.g., a substrate of a mobile phone). Two opposite sides of a conventional three-dimensional antenna structure can respectively generate a front gain value and a back gain value. The greater a power gain ratio (i.e., a front-to-back ratio) between the front gain value and the rear gain value is, the more ideal an emission effect of the conventional three-dimensional antenna structure is. However, due to technical limitations, the conventional three-dimensional antenna structure cannot effectively increase the power gain ratio.

SUMMARY OF THE DISCLOSURE

In response to the above-referenced technical inadequacy, the present disclosure provides a three-dimensional antenna structure.

In order to solve the above-mentioned problem, one of the technical aspects adopted by the present disclosure is to provide a three-dimensional antenna structure. The three-dimensional antenna structure is applicable to a transmission frequency band, and includes an insulating carrier, an M number of first antennas, an M number of microstrip lines, a second antenna, and a grounding element. The insulating carrier includes a first substrate and a second substrate that are spaced apart from each other. The M first antennas are disposed on one of two side surfaces of the first substrate. The M first antennas are spaced apart from each other, and M is a positive integer greater than or equal to 3. The M microstrip lines are respectively and electrically coupled to the M first antennas, and each of the M microstrip lines has a grounding point and a connection point. The second antenna is disposed on one of two side surfaces of the second substrate. The second antenna is electrically coupled to the M first antennas through the connection point of each of the M microstrip lines, the second antenna has an M−1 number of line segments, and any end of each of the M−1 line segments correspond in position to one of the connection points. A length of each of the M−1 line segments is 1/M times a wavelength corresponding to a center frequency of the transmission frequency band. The grounding element is disposed on another one of the two side surfaces of the second substrate. The grounding element is electrically coupled to the M first antennas through the grounding points of the M microstrip lines.

In one of the possible or preferred embodiments, the three-dimensional antenna structure further includes an impedance antenna disposed on the one of the two side surfaces of the second substrate. The impedance antenna extends from an end of the second antenna, and a length of the impedance antenna is ¼ times the wavelength corresponding to the center frequency of the transmission frequency band. The impedance antenna has a feed point.

In one of the possible or preferred embodiments, the grounding element is further defined as a conductive metal layer that covers the another one of the two side surfaces of the second substrate.

In one of the possible or preferred embodiments, the insulating carrier further includes a support component. The support component is disposed between the first substrate and the second substrate, and the support component has a height direction toward the first substrate and the second substrate. The M microstrip lines are disposed on the support component, and each of the M microstrip lines has a first segment along the height direction and a second segment that is perpendicular to the first segment. An end of the first segment has the connection point and an end of the second segment has the grounding point.

In one of the possible or preferred embodiments, the support component has an M number of support plates, a portion of each of the M support plates vertically penetrates the first substrate and the second substrate, so that the first substrate and the second substrate are configured to be held by the M support plates and be spaced apart from each other by a predetermined distance.

In one of the possible or preferred embodiments, the M support plates are in a radial arrangement, and a central point of the first substrate or the second substrate is configured as a radiation center.

In one of the possible or preferred embodiments, the second antenna has a feed point, each of the M−1 line segments has a plurality of bending portions, and the feed point is located on one of the bending portions of any one of the M−1 line segments.

In one of the possible or preferred embodiments, the three-dimensional antenna structure further includes an M number of third antennas disposed on another one of the two side surfaces of the first substrate. The M third antennas correspond in shape and position to the M first antennas, respectively, and portions of the M third antennas penetrate the first substrate to be respectively and electrically coupled to the M first antennas.

In one of the possible or preferred embodiments, a phase difference is generated between the connection points of any two of the M microstrip lines, and the phase difference is 360/M degrees.

Therefore, in the three-dimensional antenna structure provided by the present disclosure, by virtue of "the M first antennas being spaced apart from each other" and "the second antenna having M−1 line segments, any end of each of the M−1 line segments corresponding in position to one of the connection points, and a length of each of the M−1 line segments being 1/M times a wavelength corresponding to a center frequency of the transmission frequency band," a power gain ratio of the three-dimensional antenna structure can be effectively increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
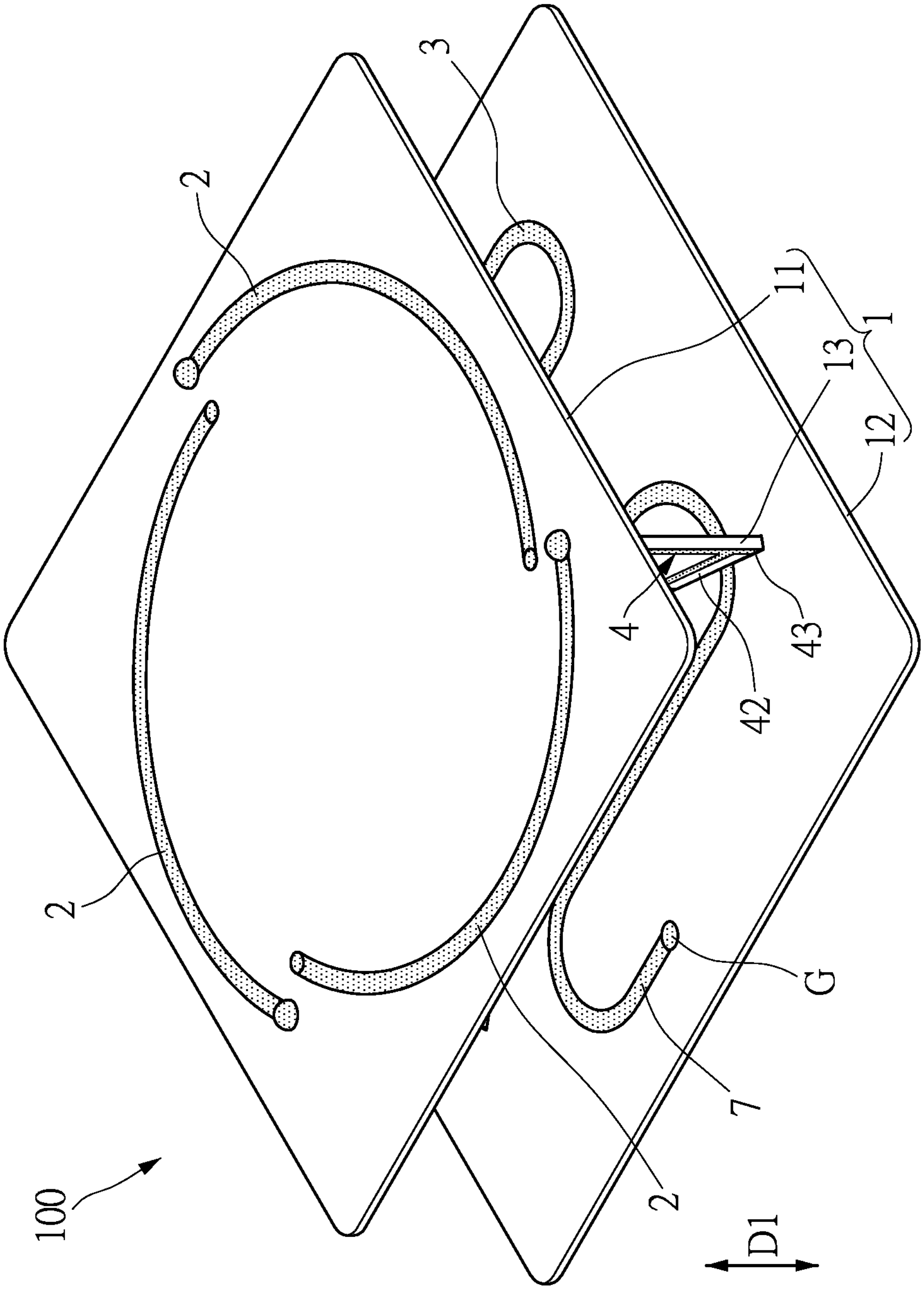
FIG. 1 is a schematic perspective view of a three-dimensional antenna structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Figure 2:
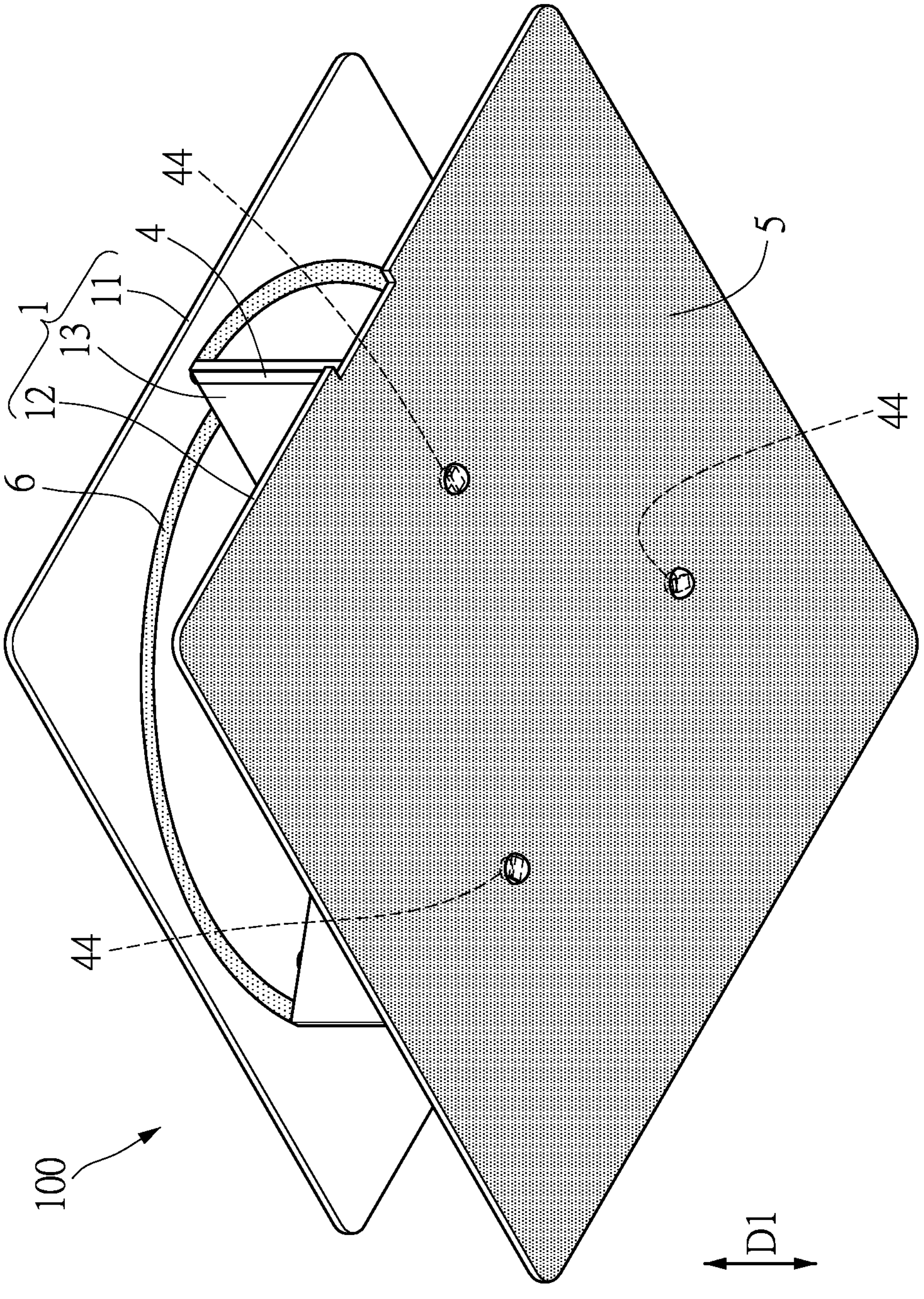
FIG. 2 is another schematic perspective view of the three-dimensional antenna structure according to the present disclosure.

Referring to FIG. 1 to FIG. 10, the present disclosure provides a three-dimensional antenna structure 100 that is applicable to a transmission frequency band. As shown in FIG. 1 and FIG. 2, the three-dimensional antenna structure 100 includes an insulating carrier 1, an M number of first antennas 2 and a second antenna 3 disposed on the insulating carrier 1, an M number of microstrip lines 4 electrically coupled to the M first antennas 2 and the second antenna 3, and a grounding element 5 that is electrically coupled to the M microstrip lines 4.

In the present embodiment, M is an algebraic variable and is exemplified as being three. However, M can be adjusted according to practical requirements. For example, M can also be four, five, or any positive integer greater than or equal to 3, and details thereof will not be described herein.

Figure 7:
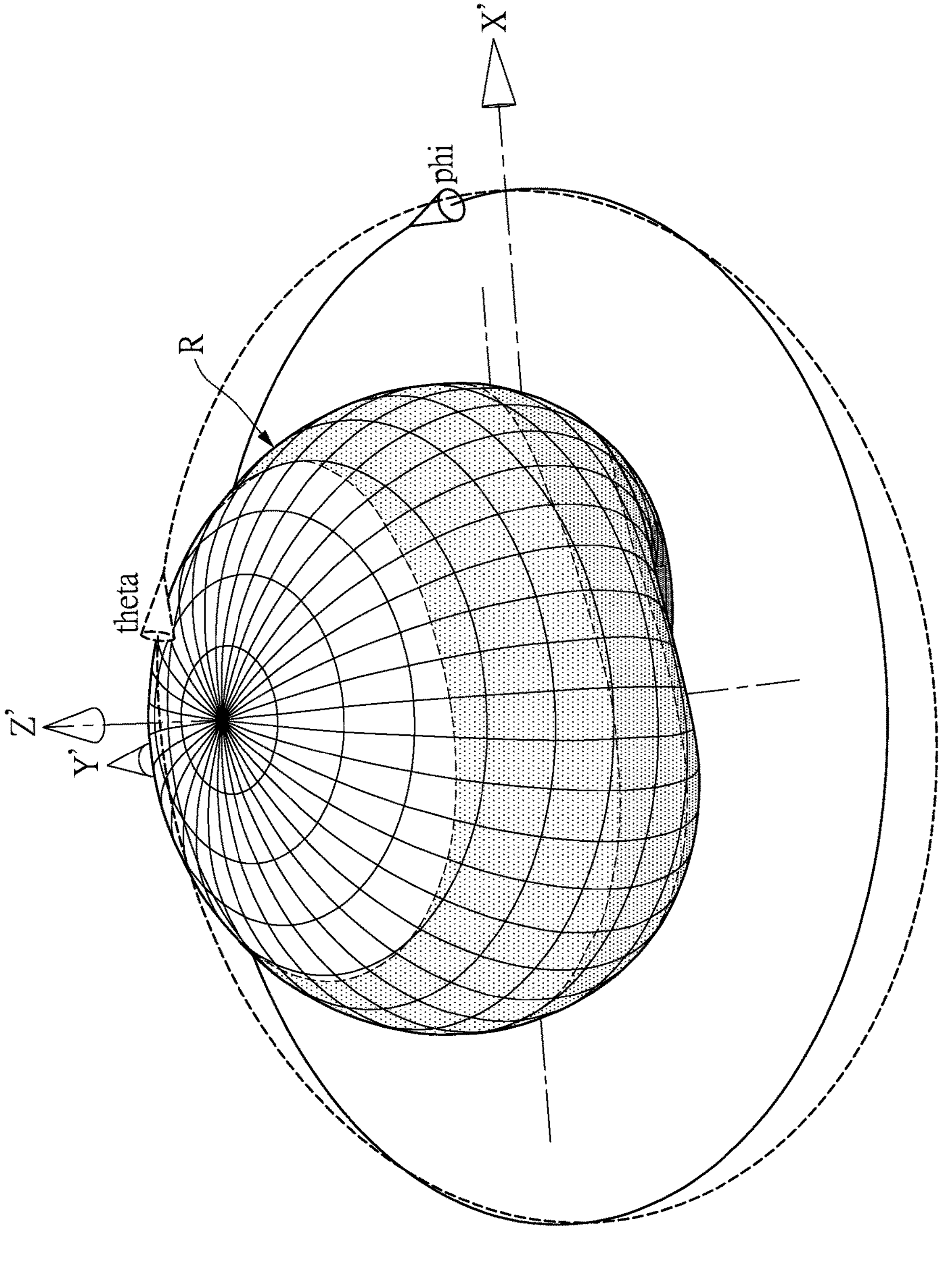
FIG. 7 is a schematic diagram of a radiation pattern produced by the three-dimensional antenna structure according to the present disclosure.
Figure 8:
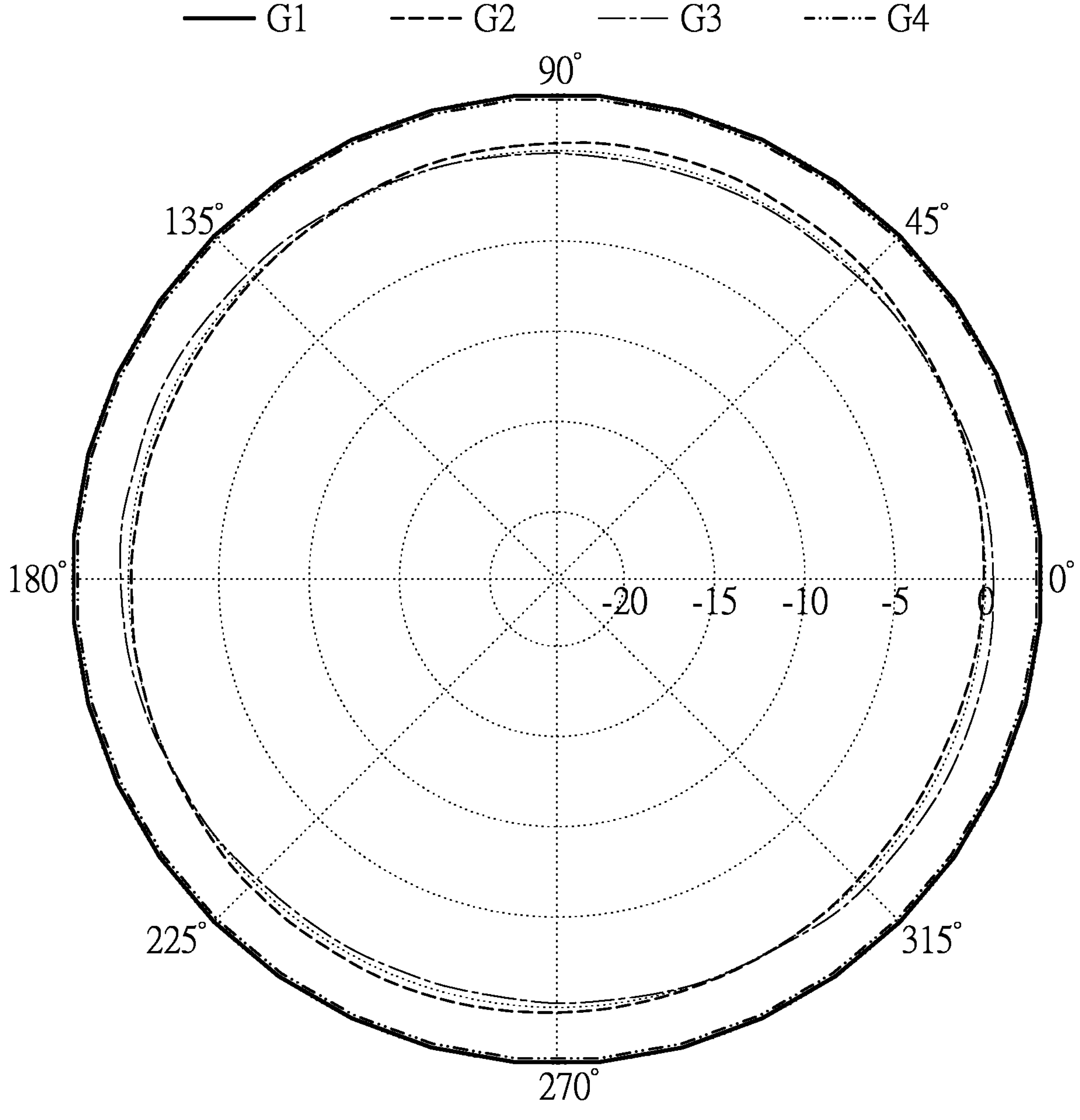
FIG. 8 is a schematic diagram of the radiation pattern of the three-dimensional antenna structure in an E-plane or an H-plane according to the present disclosure.

The three-dimensional antenna structure 100 can generate a radiation pattern R that is circularly polarized by cooperation of the M first antennas 2, the second antenna 3, and the M microstrip lines 4 (as shown in FIG. 7 and FIG. 8). In other words, any antenna structure that does not generate a circularly polarized radiation pattern is not the three-dimensional antenna structure 100 of the present disclosure. The following description describes the structure and connection relationship of each component of the three-dimensional antenna structure 100.

Figure 3:
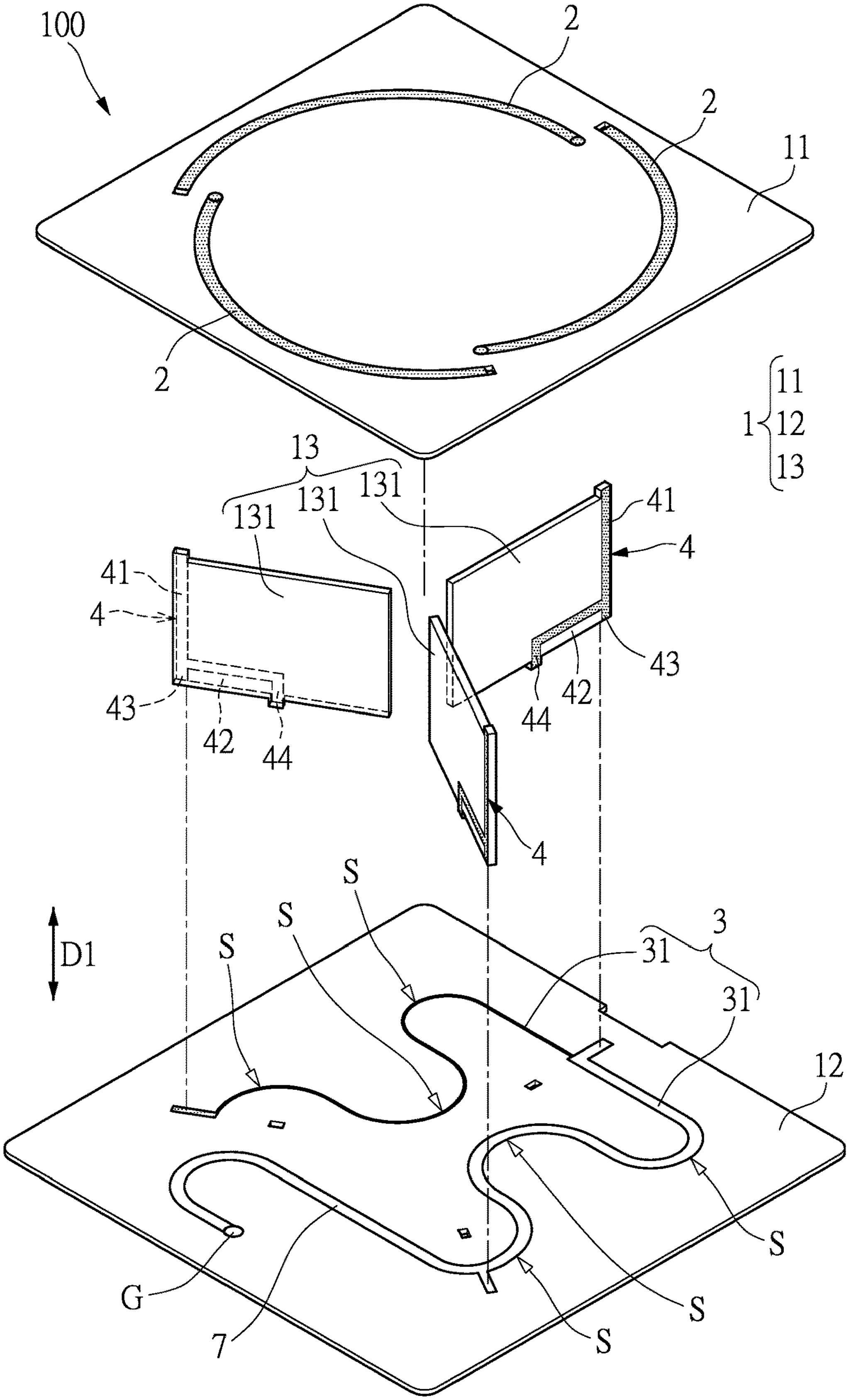
FIG. 3 is a schematic exploded view of the three-dimensional antenna structure according to the present disclosure.
Figure 4:
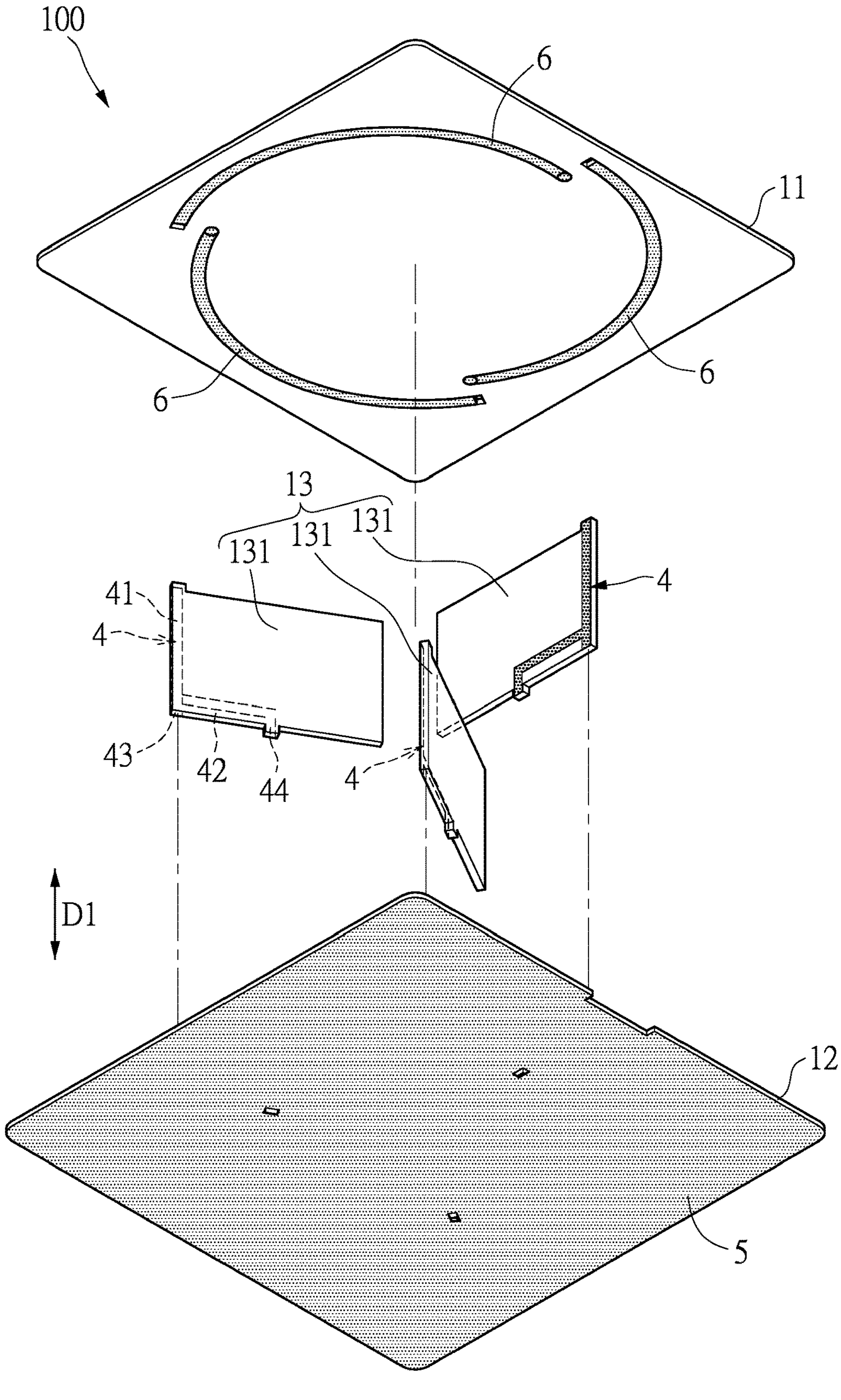
FIG. 4 is another schematic exploded view of the three-dimensional antenna structure according to the present disclosure.
Figure 5:
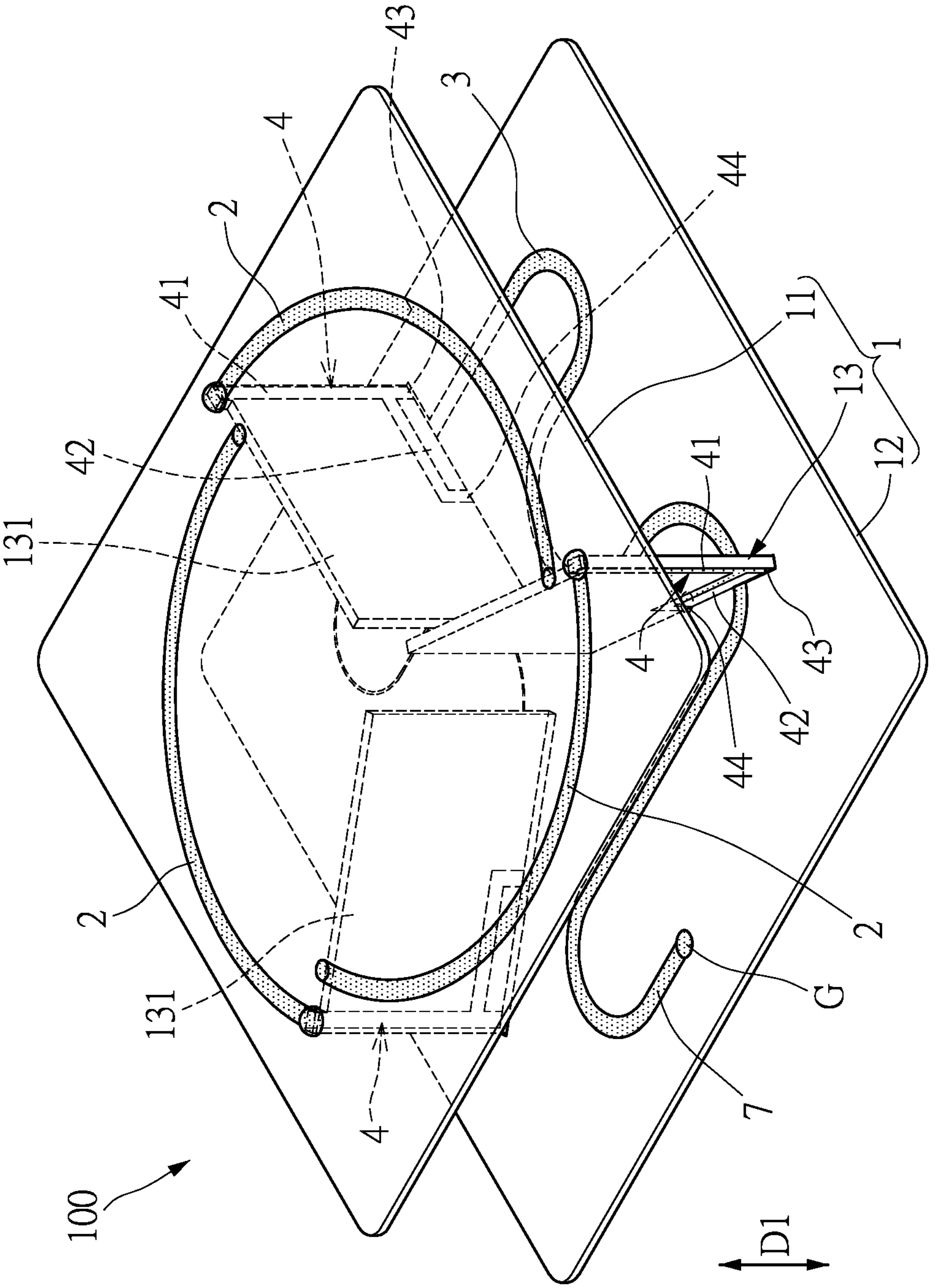
FIG. 5 is a partial schematic perspective view of the three-dimensional antenna structure according to the present disclosure.

Referring to FIG. 3 and FIG. 4, the insulating carrier 1 includes a first substrate 11 and a second substrate 12 that are spaced apart from each other, and a support component 13 that is disposed between the first substrate 11 and the second substrate 12.

The first substrate 11 and the second substrate 12 can each be a rectangular plate structure. That is, each of the first substrate 11 and the second substrate 12 has two side surfaces (i.e., width side surfaces) that are opposite to each other. In addition, the first substrate 11 and the second substrate 12 are spaced apart from each other. The first substrate 11 and the second substrate 12 can be, for example, parallel to each other, so that a predetermined distance is defined between components on the first substrate 11 (e.g., the M first antennas 2) and components on the second substrate 12 (e.g., the second antenna 3).

In a practical application, each of the first substrate 11 and the second substrate 12 can be, for example, a printed circuit board (PCB), and a size of the first substrate 11 is substantially equal to a size of the second substrate 12, but the present disclosure is not limited thereto. For example, in another embodiment of the present disclosure (not shown in the drawings), the size of the first substrate 11 is not equal to the size of the second substrate 12, and the first substrate 11 and the second substrate 12 have different shapes.

In addition, the support component 13 has a height direction D1 toward the first substrate 11 and the second substrate 12, and the support component 13 has an M number of support plates 131. A quantity of the M support plates 131 in the present embodiment is three (that is, M has a value of 3). Each of the three support plates 131 is a rectangular plate structure, and a portion of each of (narrow side surfaces of) the M support plates 131 vertically penetrates (the width side surfaces of) the first substrate 11 and the second substrate 12, so that the first substrate 11 and the second substrate 12 are configured to be held by the M support plates 131 and be spaced apart from each other by the predetermined distance. Preferably, the M support plates 131 are in a radial arrangement, and a central point of the first substrate 11 or the second substrate 12 is configured as a radiation center, but the present disclosure is not limited thereto.

For example, in another embodiment of the present disclosure (not shown), the support component 13 can be omitted, and the first substrate 11 and the second substrate 12 can maintain the predetermined distance therebetween through other adjacent components (e.g., other support frames in a final product). Naturally, the support component 13 can also be a supporting frame of an independent member, so as to support the first substrate 11 and the second substrate 12.

Referring to FIG. 3 and FIG. 4, the M first antennas 2 are disposed on one of the width side surfaces of the first substrate 11 away from the second substrate 12, and the M first antennas 2 are spaced apart from each other. A quantity of the M first antennas 2 in the present embodiment is three (that is, M is 3), and each of the first antennas 2 is a conductive copper layer that is in a curved shape, but the present disclosure is not limited thereto. For example, in another embodiment of the present disclosure (not shown), each of the first antennas 2 may also be in a rectangular shape or a linear shape.

In a practical application, the three first antennas 2 may be located on the one of the width side surfaces of the first substrate 11 away from the second substrate 12. Moreover, the three-dimensional antenna structure 100 further includes an M number of third antennas 6. A quantity of the M third antennas 6 in the present embodiment is also three (that is, M is 3), and the M third antennas 6 are disposed on another one of the width side surfaces of the first substrate 11. In other words, the three third antennas 6 and the three first antennas 2 are located on opposite sides of the first substrate 11. Preferably, the three third antennas 6 respectively correspond in shape and position to the three first antennas 2. Further, portions of the three third antennas 6 penetrate the first substrate 11 to be respectively and electrically coupled to the three first antennas 2 (by a conductive column).

Naturally, when the three third antennas 6 are omitted from the three-dimensional antenna structure 100, the three first antennas 2 can also be located on the another one of the width side surfaces of the first substrate 11 facing the second substrate 12.

Referring to FIG. 3 and FIG. 4, a quantity of the M microstrip lines 4 in the present embodiment is three (that is, M is 3). The three microstrip lines 4 are respectively disposed on the three support plates 131, and are respectively and electrically coupled to the three first antennas 2. Specifically, each of the three microstrip lines 4 can be a conductive copper layer that is substantially L-shaped, and each of the three microstrip lines 4 has a first segment 41 along the height direction D1 and a second segment 42 that is perpendicular to the first segment 41. In each of the three microstrip lines 4, the microstrip line 4 has a connection point 43 at an end of the first segment 41 for being electrically coupled to the second antenna 3 (by soldering), and the microstrip line 4 has a grounding point 44 at an end of the second segment 42 for being electrically coupled to the grounding element 5 (by soldering). Naturally, in another embodiment of the present disclosure (not shown), the microstrip line 4 can also have other shapes. In other words, in the present disclosure, no limitation is imposed on the shape of the microstrip line 4.

In addition, it should be noted that a phase difference is generated between the connection points 43 of any two of the three microstrip lines 4, and the phase difference is 360/M degrees. That is to say, in the present embodiment, based on the quantity of the M first antennas 2 being three (that is, M is 3), the aforementioned phase difference is 120 degrees.

Referring to FIG. 1 and FIG. 3, the second antenna 3 is disposed on the width side surface of the second substrate 12 facing the first substrate 11, and the second antenna 3 is electrically coupled to the M first antennas 2 through the three connection points 43. The second antenna 3 has an M−1 number of line segments 31, and the M−1 line segments 31 corresponds in quantity to the M connection points 43. That is, a quantity of the M−1 line segments 31 in the present embodiment is two (i.e., M−1 is 2).

In detail, each of the two line segments 31 is separated by any two of the connection points 43. In other words, any end of each of the two line segments 31 corresponds in position to one of the connection points 43, and a length of each of the two line segments 31 is preferably 1/M times a wavelength corresponding to a center frequency of the transmission frequency band. That is to say, the length of each of the two line segment 31 in the present embodiment is ⅓ times the wavelength corresponding to the center frequency. In the present embodiment, a width of one of the two line segments 31 is smaller than that of another one of the two line segments 31, but the present disclosure is not limited thereto. In practice, the width of each of the two line segments 31 is an ohm value of the two connection points 43 that correspond in position to each other.

In addition, in order to effectively reduce a volume of the three-dimensional antenna structure 100, the second antenna 3 can be a multi-curved conductive copper layer. Specifically, each of the two line segments 31 in the present embodiment has a plurality of bending portions S, and openings of any two adjacent ones of the bending portions S are opposite to each other, so that each of the two line segments 31 is in a wave shape, but the present disclosure is not limited thereto. For example, each of the two line segments 31 can also be in a linear shape or an irregular shape.

It should be noted that the three-dimensional antenna structure 100 also includes an impedance antenna 7 located on the second substrate 12. The impedance antenna 7 extends from an end of the second antenna 3, and a length of the impedance antenna 7 is ¼ times the wavelength corresponding to the center frequency of the transmission frequency band. The impedance antenna 7 in the present embodiment is a conductive copper layer that is J-shaped, and a feed point G is provided at an end of the impedance antenna 7, but the present disclosure is not limited thereto.

For example, in another embodiment of the present disclosure (not shown), the impedance antenna 7 is omitted from the three-dimensional antenna structure 100, and the second antenna 3 has a feed point. This feed point is located on any one of the two line segments 31 to replace the feed point G of the impedance antenna 7.

Referring to FIG. 2 and FIG. 4, the grounding element 5 is disposed on the width side surface of the second substrate 12 away from the first substrate 11. In other words, the grounding element 5 and the second antenna 3 are respectively located on opposite sides of the second substrate 12. The grounding element 5 is electrically coupled to the three first antennas 2 through the three grounding points 44. In practice, the three grounding points 44 pass through the second substrate 12 to be connected to the grounding element 5 (by a conductive column).

The grounding element 5 in the present embodiment is a conductive metal layer and (completely) covers the width side surface of the second substrate 12 facing the first substrate 11. Naturally, the grounding member 5 may also be a member of any other type that can provide grounding for the three first antennas 2.

Figure 6:
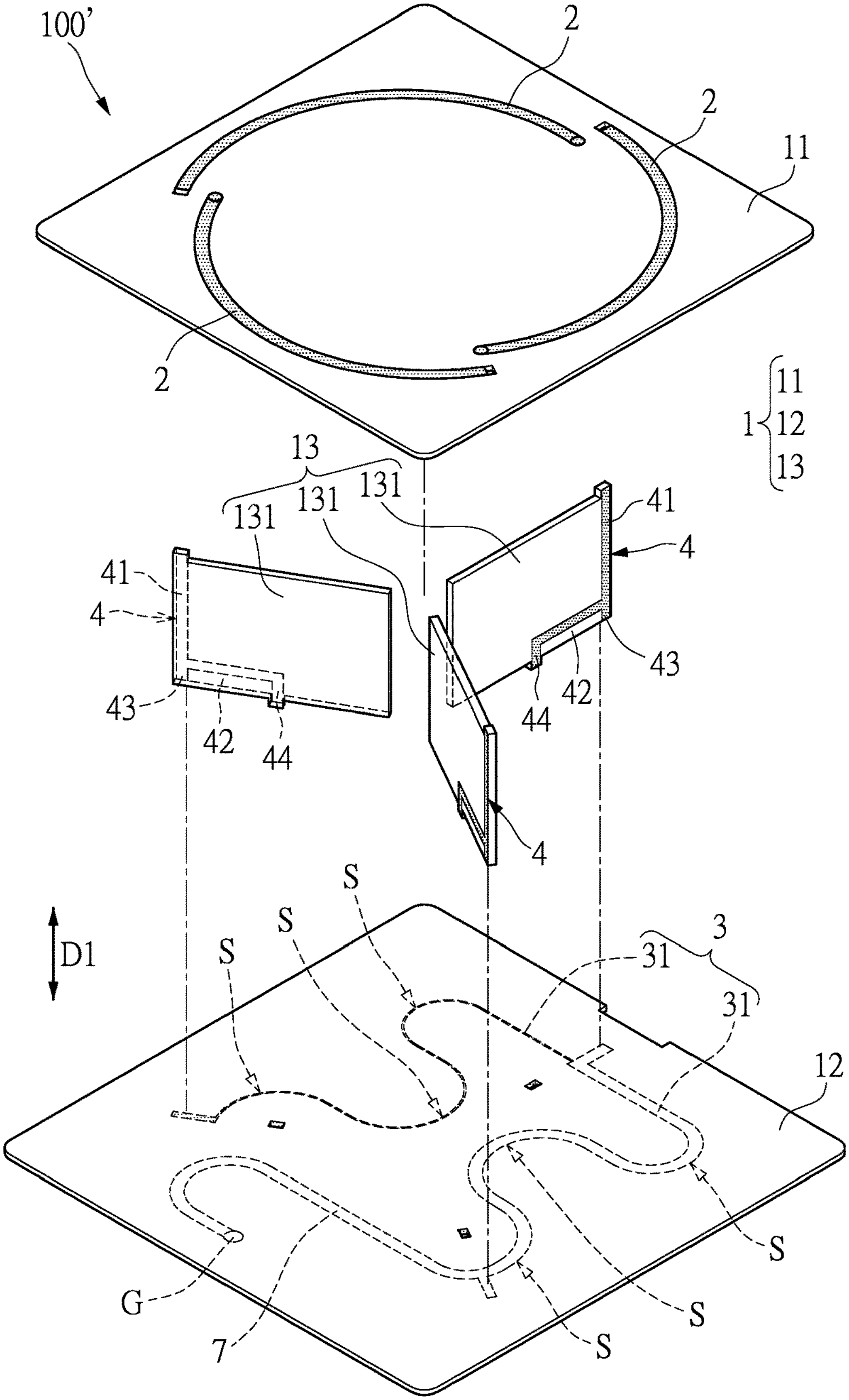
FIG. 6 is a schematic perspective view of another configuration of the three-dimensional antenna structure according to the present disclosure.

Furthermore, in another configuration of the present disclosure, it should be noted that positions of the grounding member 5 and the second antenna 3 of a three-dimensional antenna structure 100' can be interchanged with each other on the second substrate 12 (as shown in FIG. 6). That is to say, the grounding member 5 is located on the width side surface of the second substrate 12 facing the first substrate 11, and the second antenna 3 is located on the width side surface of the second substrate 12 away from the first substrate 11.

In addition, FIG. 7 shows a radiation pattern R generated by the three-dimensional antenna structure 100 of the present embodiment in a particular frequency, and FIG. 8 is a schematic diagram of the radiation pattern R in an E-plane or an H-plane. The lower a dot density in FIG. 7 is, the higher a gain value becomes. In the schematic diagram of FIG. 8, there are four lines G1 to G4. The line G1 is a total gain value, the line G2 is the gain value in a θ direction, the line G3 is the gain value in a Φ direction, and the line G4 is the gain value in a left direction. It can be observed from FIG. 7 and FIG. 8 that the radiation pattern R of the three-dimensional antenna structure 100 is substantially a circle.

Figure 9:
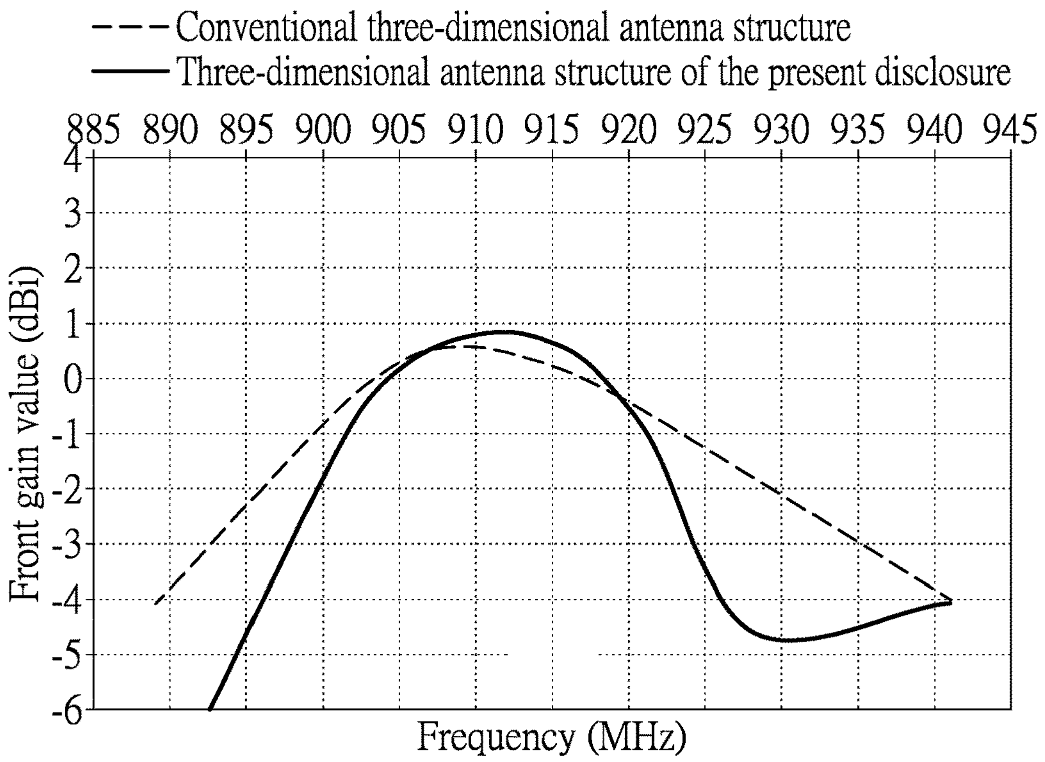
FIG. 9 is a graph illustrating a relationship between a front gain value and a frequency for each of the three-dimensional antenna structure of the present disclosure and a conventional three-dimensional antenna structure.
Figure 10:
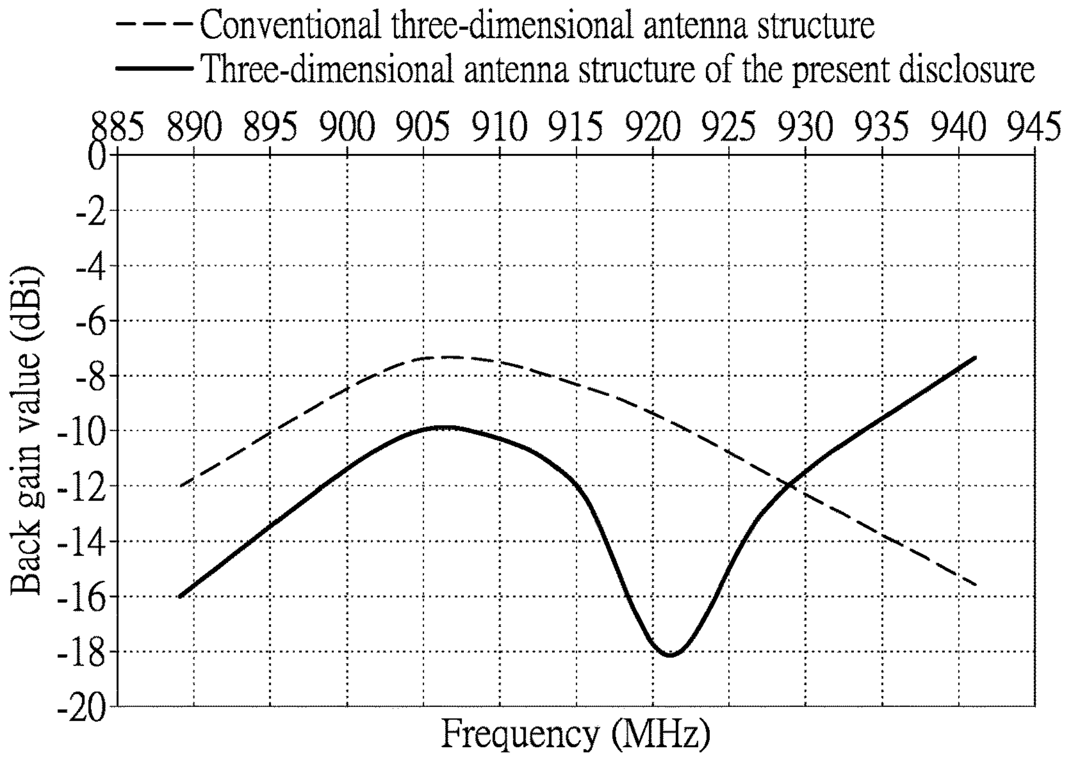
FIG. 10 is a graph illustrating a relationship between a back gain value and the frequency for each of the three-dimensional antenna structure of the present disclosure and the conventional three-dimensional antenna structure.

Moreover, FIG. 9 is a relation diagram of a front gain value and a frequency of the three-dimensional antenna structure 100 according to the present disclosure, and FIG. 10 is a relation diagram of a back gain value and the frequency of the three-dimensional antenna structure 100 according to the present disclosure. Through numerical values shown in FIG. 9 and FIG. 10, the data in Table 1 and Table 2 below can be obtained.

TABLE 1

| Conventional three-dimensional antenna structure | | | | | |
|---|---|---|---|---|---|
| Frequency (MHz) | 902 | 908 | 915 | 921 | 928 |
| Front gain value (dBi) | −0.30 | 0.56 | 0.22 | −0.60 | −1.80 |
| Back gain value (dBi) | −7.92 | −7.40 | −8.35 | −9.66 | −11.72 |
| Power gain ratio (dB) | 7.62 | 7.96 | 8.57 | 9.06 | 9.92 |

TABLE 2

| Three-dimensional antenna structure of the present disclosure | | | | | |
|---|---|---|---|---|---|
| Frequency (MHz) | 902 | 908 | 915 | 921 | 928 |
| Front gain value (dBi) | −0.77 | 0.64 | 0.63 | −0.95 | −4.58 |
| Back gain value (dBi) | −10.64 | −10.00 | −12.05 | −18.07 | −12.39 |
| Power gain ratio (dB) | 9.87 | 10.64 | 12.68 | 17.12 | 7.81 |

It can be observed from Tables 1 and 2 above that the power gain ratio of the three-dimensional antenna structure 100 of the present disclosure exceeds 10 dB at frequencies between 908 MHz and 921 MHz. When the three-dimensional antenna structure 100 of the present disclosure and the conventional three-dimensional antenna structure are at the frequencies between 908 MHz and 921 MHz, a difference in power gain ratio between the three-dimensional antenna structure 100 of the present disclosure and the conventional three-dimensional antenna structure is more than 2 dB. That is to say, an emission effect of the three-dimensional antenna structure 100 of the present disclosure is better and more significant at the frequencies between 908 MHz and 921 MHz.

Beneficial Effects of the Embodiment

In conclusion, in the three-dimensional antenna structure provided by the present disclosure, by virtue of "the M first antennas being spaced apart from each other" and "the second antenna having M−1 line segments, any end of each of the M−1 line segments corresponding in position to one of the connection points, and a length of each of the M−1 line segments being 1/M times a wavelength corresponding to a center frequency of the transmission frequency band," a power gain ratio of the three-dimensional antenna structure can be effectively increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A three-dimensional antenna structure, which is applicable to a transmission frequency band, the three-dimensional antenna structure comprising:

an insulating carrier including a first substrate and a second substrate that are spaced apart from each other;

an M number of first antennas disposed on one of two side surfaces of the first substrate, wherein the M first antennas are spaced apart from each other, and M is a positive integer greater than or equal to 3;

an M number of microstrip lines respectively and electrically coupled to the M first antennas, wherein each of the M microstrip lines has a grounding point and a connection point;

a second antenna disposed on one of two side surfaces of the second substrate, wherein the second antenna is electrically coupled to the M first antennas through the connection point of each of the M microstrip lines, the second antenna has an M−1 number of line segments, and any end of each of the M−1 line segments correspond in position to one of the connection points, and wherein a length of each of the M−1 line segments is 1/M times a wavelength corresponding to a center frequency of the transmission frequency band; and a grounding element disposed on another one of the two side surfaces of the second substrate, wherein the grounding element is electrically coupled to the M first antennas through the grounding points of the M microstrip lines.

2. The three-dimensional antenna structure according to claim 1, further comprising an impedance antenna disposed on the one of the two side surfaces of the second substrate, wherein the impedance antenna extends from an end of the second antenna, and a length of the impedance antenna is ¼ times the wavelength corresponding to the center frequency of the transmission frequency band, and wherein the impedance antenna has a feed point.

3. The three-dimensional antenna structure according to claim 1, wherein the grounding element is further defined as a conductive metal layer that covers the another one of the two side surfaces of the second substrate.

4. The three-dimensional antenna structure according to claim 1, wherein the insulating carrier further includes a support component, the support component is disposed between the first substrate and the second substrate, and the support component has a height direction toward the first substrate and the second substrate, wherein the M microstrip lines are disposed on the support component, and each of the M microstrip lines has a first segment along the height direction and a second segment that is perpendicular to the first segment, and wherein an end of the first segment has the connection point, and an end of the second segment has the grounding point.

5. The three-dimensional antenna structure according to claim 4, wherein the support component has an M number of support plates, and a portion of each of the M support plates vertically penetrates the first substrate and the second substrate, so that the first substrate and the second substrate are configured to be held by the M support plates and be spaced apart from each other by a predetermined distance.

6. The three-dimensional antenna structure according to claim 5, wherein the M support plates are in a radial arrangement, and a central point of the first substrate or the second substrate is configured as a radiation center.

7. The three-dimensional antenna structure according to claim 1, wherein the second antenna has a feed point, each of the M−1 line segments has a plurality of bending portions, and the feed point is located on one of the bending portions of any one of the M−1 line segments.

8. The three-dimensional antenna structure according to claim 1, further comprising an M number of third antennas disposed on another one of the two side surfaces of the first substrate, wherein the M third antennas correspond in shape and position to the M first antennas, respectively, and portions of the M third antennas penetrate the first substrate to be respectively and electrically coupled to the M first antennas.

9. The three-dimensional antenna structure according to claim 1, wherein a phase difference is generated between the connection points of any two of the M microstrip lines, and the phase difference is 360/M degrees.

* * * * *